United States Patent
Chen (10) Patent No.: US 7,570,558 B2
(45) Date of Patent: Aug. 4, 2009

(54) DISC PLAYING METHOD WITHOUT INTERRUPTION AND SYSTEM THEREOF

(75) Inventor: Samuel Chen, Hsin-Tien (TW)

(73) Assignee: Via Technologies, Inc., Taipei (TW)

( * ) Notice: Subject to any disclaimer, the term of this patent is extended or adjusted under 35 U.S.C. 154(b) by 753 days.

(21) Appl. No.: 11/217,334

(22) Filed: Sep. 2, 2005

(65) Prior Publication Data

US 2006/0077814 A1    Apr. 13, 2006

(30) Foreign Application Priority Data

Sep. 3, 2004    (TW)    ............................... 93126787 A (51) Int. Cl.
*G11B 7/00* (2006.01)
(52) U.S. Cl. ............... 369/53.15; 369/53.17; 369/47.31
(58) Field of Classification Search ............. 369/53.11, 369/53.12, 53.14, 53.15, 53.17, 47.31, 47.13, 369/47.14, 47.22, 53.31
See application file for complete search history.

(56) References Cited

U.S. PATENT DOCUMENTS

| 7,106,679 | B2 * | 9/2006 | Sasaki et al. | 369/53.35 |
| 7,134,051 | B2 * | 11/2006 | Takaichi | 714/42 |
| 7,164,636 | B2 * | 1/2007 | Ijtsma et al. | 369/47.53 |
| 7,167,429 | B2 * | 1/2007 | Chiang | 369/53.17 |
| 7,283,441 | B2 * | 10/2007 | Motohashi | 369/47.14 |

FOREIGN PATENT DOCUMENTS

| CN | 1164092 | 11/1997 |
| CN | 1462447 | 12/2003 |

* cited by examiner

*Primary Examiner*—Nabil Z Hindi
(74) *Attorney, Agent, or Firm*—Rabin & Berdo, P.C.

(57) ABSTRACT

A disc playing method and related system without interruption is disclosed. First, the data blocks on a disc (such as a DVD) is previewed without playing. Next, the error ratio of the data block is determined. If the error ratio of the data block exceeds a predetermined threshold, the address of the data block is recorded in an error data table. Finally, the data blocks not recorded in the error data table are played.

16 Claims, 7 Drawing Sheets

| Data M |
| --- |
| Data M+1 |
| Data M+2 |
| Data M+3 |
| Data M+4 |
| Data M+5 |
| Data M+6 |
| Data M+7 |
| Data M+8 |
| Data M+9 |
| Data M+10 |
| Data M+11 |
| Data M+12 |
| Data M+13 |
| Data M+14 |
| Data M+15 |
| Data M+16 |
| Data M+17 |

| Data M |
|---|
| Data M+1 |
| Data M+2 |
| Data M+3 |
| Data M+4 |
| Data M+5 |
| Data M+6 |
| Data M+7 |
| Data M+8 |
| Data M+9 |
| Data M+10 |
| Data M+11 |
| Data M+12 |
| Data M+13 |
| Data M+14 |
| Data M+15 |
| Data M+16 |
| Data M+17 |

| Error data table |
|---|
| Data M+2 |
| Data M+3 |
| Data M+4 |
| Data M+5 |
| Data M+7 |
| Data M+11 |
| Data M+12 |
| Data M+16 |

DISC PLAYING METHOD WITHOUT INTERRUPTION AND SYSTEM THEREOF

RELATED APPLICATIONS

The present application is based on, and claims priority from, Taiwan Application Serial Number 93126787, filed Sep. 3, 2004, the disclosure of which is hereby incorporated by reference herein in its entirety.

BACKGROUND

1. Field of Invention

The present invention relates to a disc playing method. More particularly, the present invention relates to a disc playing method without interruption.

2. Description of Related Art

While playing a disc, a laser diode is employed to read the data stored in the disc. During a playback operation, if errors occur in the data, due, for example, to a defect or scratch of the disc, the data read from the disc may be erroneous so as to affect playback performance. If too many errors appear in the data, the playback operation may be terminated. Most of time, to change another disc for playback is the only solution for eliminating this annoying situation.

If errors in the data are not significant, the user may skip the erroneous data by means of a so-called forward function and then continue the playback operation. However, when the user intends to use the forward function to skip the error data, he/she may have difficulty in exactly forwarding to the following errorless data, since the forward function is performed in a high speed, and frequently overshoots. The user may search back and forth in order to find the following errorless data if he/she wants to watch as much content as possible. This process is annoying and frustrating, and a cleverer strategy is desired.

Figure 1:
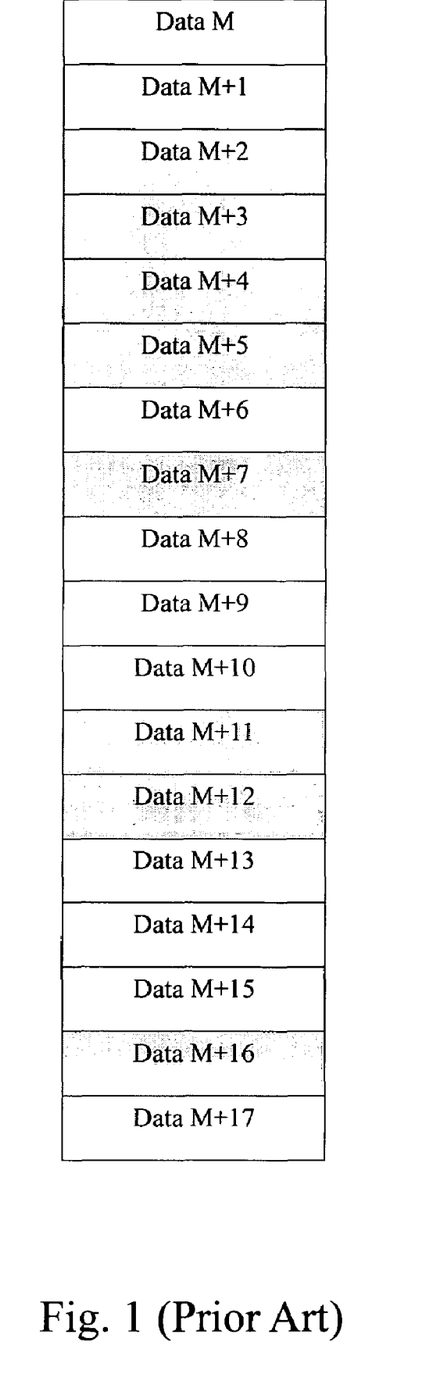
FIG. 1 is a diagram illustrating the data configuration in the disc conventionally.

FIG. 1 is a diagram illustrating the data configuration in a DVD. Blocks in white represent correct block, while blocks in gray represent error block. For example, blocks M+2 to M+5, M+7, M+11 to M+12, and M+16 are all erroneous, while the remaining blocks represent correct ones. A disc playing system will skip to block M+3 when block M+2 is encountered during playback. Since block M+3 is also erroneous, the disc-playing device will proceed to the next block. As shown in the FIG. 1, only at block M+6 will the disc playing system read correct data. If erroneous blocks are not continuously distributed, interruption may only occur while the disc playing system reads the erroneous blocks, such as blocks M+7, M+11 to M+12, or M+16. However, if error blocks are consecutively distributed such as blocks M+2 to M+5, the playback operation may be interrupted or even forced to terminate.

If an interruption occurs while the disc-playing device encounters the error data, such as error blocks M+2 to M+5, the user may manually skip to the correct one M+6 by a forward function. However, since the forward function is performed at high speed, the user may overshoot and proceed to block M+8. The user then may need to activate a backward function to return to the block M+6. Most of time, the user must follow this approach in order to search for the next correct block.

SUMMARY

In accordance with one preferred embodiment of the present invention, a disc playing method for playing the disc without interruption is proposed. First, all data blocks stored in a disc are previewed to judge whether an error ratio of each data block exceeds a predetermined threshold. If the error ratio of the data block exceeds the predetermined threshold, the address of the erroneous data block is recorded in an error data table. While playing the disc, only the data block not recorded in the error data table are played.

In accordance with another preferred embodiment of the present invention, a disc playing system for playing the disc without interruption is proposed. The disc playing system includes a previewing module, a recording module, and a playing module. The previewing module previews all data blocks in the disc to judge whether the error ratio of each data block exceeds a predetermined threshold; and the recording module records the address of the error data blocks in an error data table while the error ratio of the data block exceeds the predetermined threshold. The playing modules only play the data blocks not recorded in the error data table.

The disc playing method and the disc playing system according to the present invention can play the disc smoothly without interruption. The playing interruption due to error data blocks can be avoided. An audience can therefore enjoy superior entertainment quality. Besides, the disc playing method and the system thereof can be implemented in various disc playing devices or disc recording devices.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will be better understood with regard to the following description, appended claims, and accompanying drawings, where:

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 2:
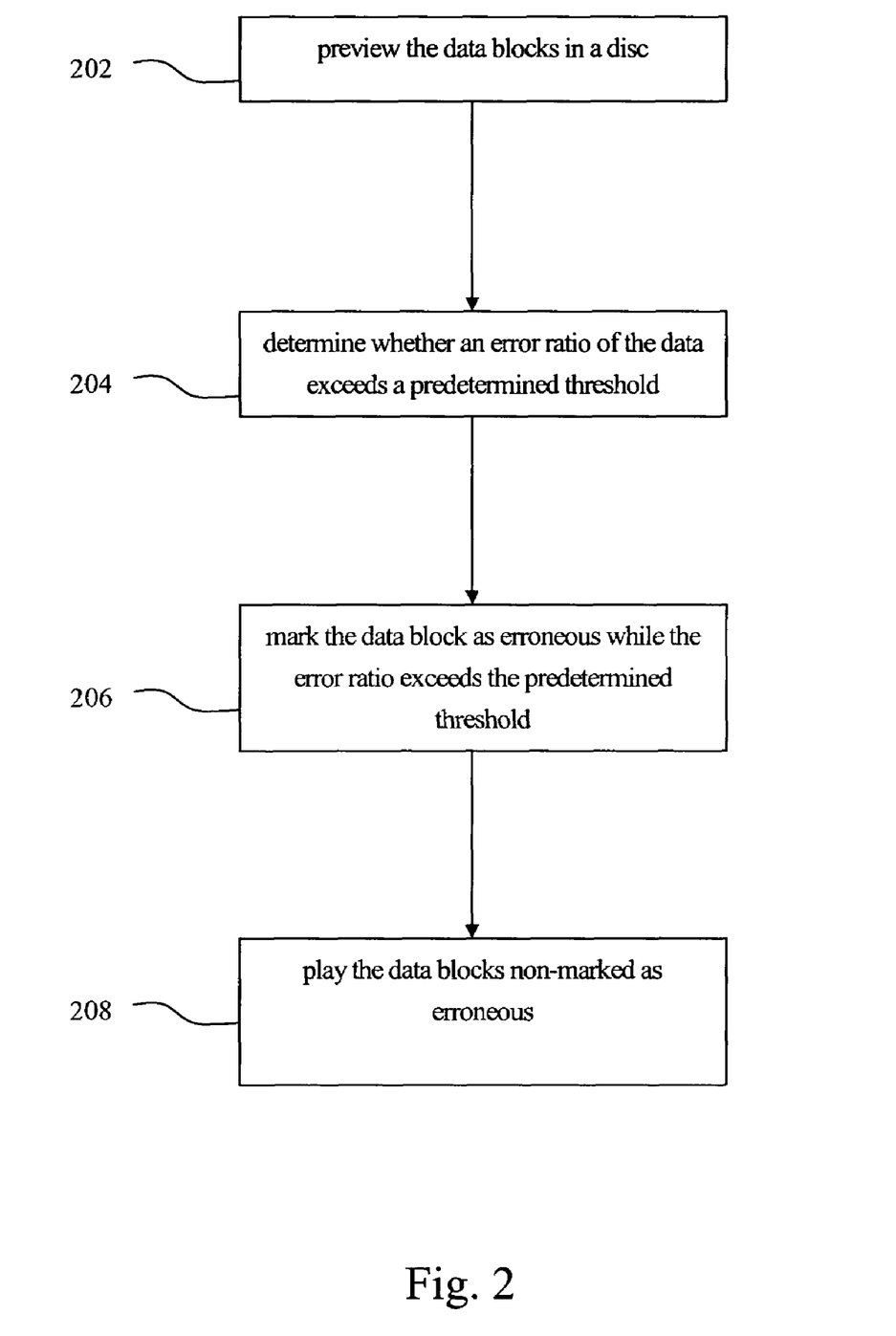
FIG. 2 is a flowchart illustrating the disc playing method according to the present invention.

FIG. 2 is a flowchart illustrating the disc playing method according to one preferred embodiment of the present invention. First, all blocks in the disc are previewed (step 202). Next, whether the error ratio of a previewed blocks exceeds a predetermined threshold is determined (step 204). If the error ratio exceeds the predetermined threshold, the block is marked as erroneous (step 206). While playing the disc, only blocks non-marked as erroneous are recovered for playback (step 208).

Figure 3:
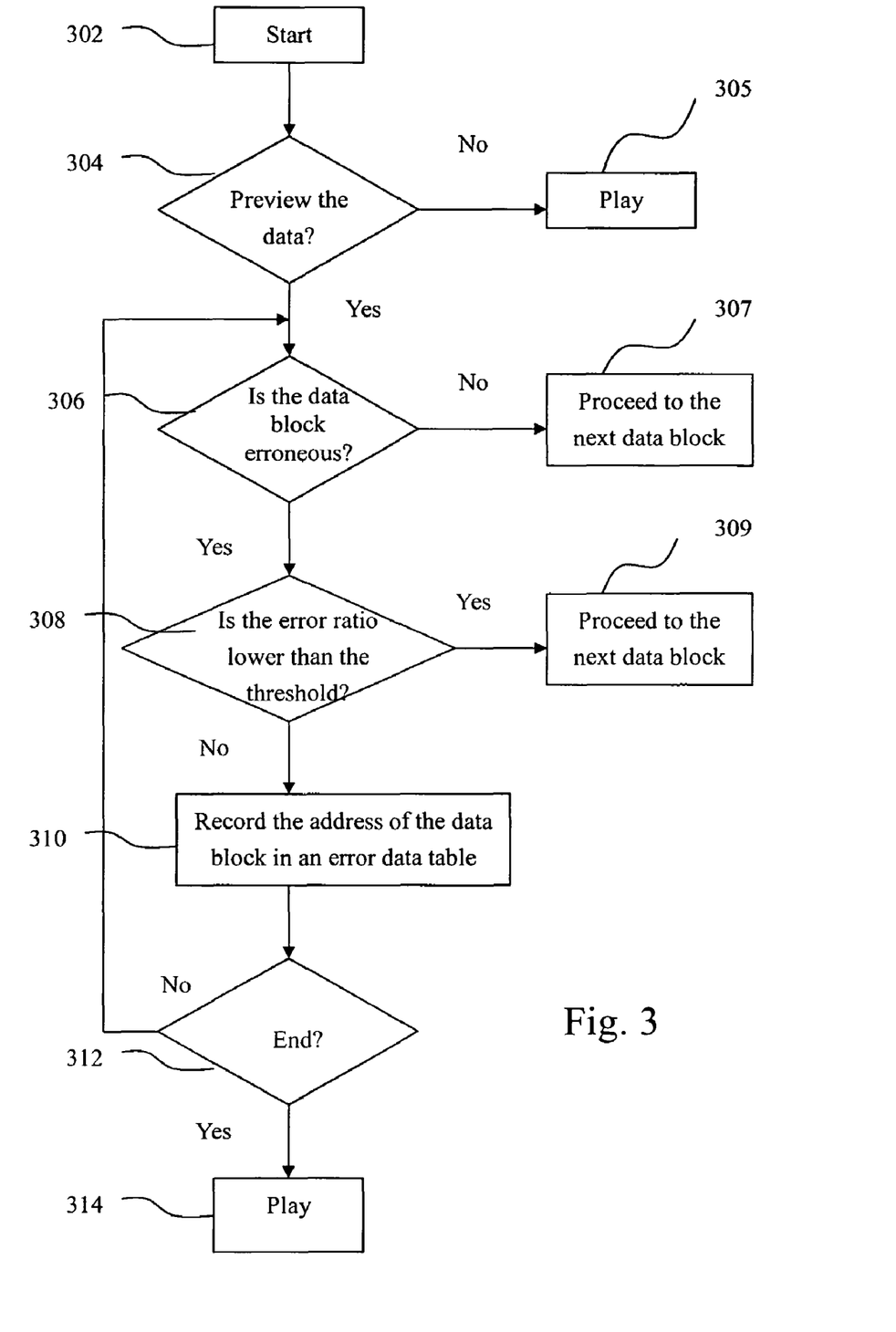
FIG. 3 is a flowchart illustrating the disc playing method according to another preferred embodiment of the present invention.

FIG. 3 is a flowchart illustrating a disc playing method according to another preferred embodiment of the present invention. The disc playing method is implemented in a disc player. When the user uses the disc player to play the disc (step 302), the user is asked whether the data stored in the disc is to be previewed (step 304).

If the user does not want to preview the data, a normal playing mode can be selected (step 305). If the user prefers to preview the data in the disc before playing, the disc player previews all blocks stored in the disc. The high scanning speed function normally installed in the conventional disc player can be employed to perform the previewing process. The high scanning speed function can preview all blocks in the disc ten times or sixteen times faster than the normal playing speed. With the high scanning speed function, the previewing process can be achieved in a very short time. A higher scanning speed can also be employed to shorten the previewing process.

Step 304 can be optional. That is, the disc player can be configured to perform the preview automatically without requesting any opinion from the user.

The purpose for performing the previewing process is to determine whether a previewed block is erroneous or not (step 306). If the previewed block is correct after preview, the preview proceeds to the next block (step 307). If the block is found to be erroneous during the preview, the error ratio of the block is determined (step 308). If the determined error ratio is lower than a predetermined threshold, an interruption will not occur during the playback operation. The block can still be regarded as a block without error, and the preview will proceed to the next block (step 309).

If the determined error ratio of the block exceeds the predetermined threshold, an interruption will occur during the playback. Therefore, the block will be regarded as erroneous, and the address of the block will be recorded in an error data table (step 310). During the playback operation, all blocks recorded in the error data table will be skipped such that the data in the disc can be played smoothly without interruption. Afterward, the user can decide whether to terminate the preview according to different applications (step 312). The disc player then plays those data blocks not recorded in the error data table (step 314).

Alternatively, the concept disclosed in the steps 310 and 314 can also be implemented by recording the addresses of all accurate blocks in a correct table when the determined error ratio of the block is lower than the predetermined threshold. When playing, only blocks recorded in the correct table are recovered for playback.

Unlike the normal disc playing process, all data can be read and decoded without being played during the disc previewing process; however, the data are read, decoded, and then played in a normal playback operation. In the case of whether the error ratio of the block exceeds the predetermined threshold, it can be judged by the error probability or the decoding rate during the decoding process.

For example, two criteria can be employed in determining the error ratio of the data. The first approach is to employ well-known Error Correction Code (ECC) and Error Detection Code (EDC) embedded in each block of a DVD. As known by any ordinary person having skills in the art, so-called error detection is the process of detecting errors during the transmission or storage of the data, while the error correction is the process of correcting those error data automatically. Those erroneous bytes may be recovered according to ECC and EDC when they are detected, although it might be impossible to repair all errors of the erroneous bytes. Therefore, ECC and EDC both can be utilized in determining the error ratio. For example, a threshold may be set as three such that any block (composed of 16 sectors) having more than three erroneous sectors (by referring their EDC in implementation) may be determined as an erroneous one even all errors in the block can be recovered by using associated ECC process.

Another approach is to detect a data decompression period while recovering related audio/video data. For example, when the audio/video data are decompressed by, for example, a MPEG decoder, required decompression period can be employed as a basis of determining the error ratio because the MPEG decoder should cost more time in decoding the data having more errors than the normal. The threshold may be assigned based on an experimental or theoretical value for this approach.

Moreover, the predetermined threshold can be decided by user-defined or default setting. When the predetermined threshold is set to a higher value, a higher error ratio is permitted. In other words, more data of the disc can be played during the disc playing, but a slight interruption may occur. On the contrary, if the audience desires a superior playing quality, the error ratio can be set to a lower value. In this situation, more data of the disc may be ignored during the disc playback operation, but a smoother playing can be achieved.

The error data table can be stored in a memory, such as a DRAM. Further, the user can decide whether to save the error data table of the disc after the previewing process. The identification code of the disc will also be saved in the error data table when the user saves the error data table, simultaneously. In this approach, the user does not have to preview the same disc again when it is selected for playback next time. The previously established error data table can be read from the memory, and the previewing process can be skipped. The storage of the error data table can provide more convenience to the user.

Figure 4:
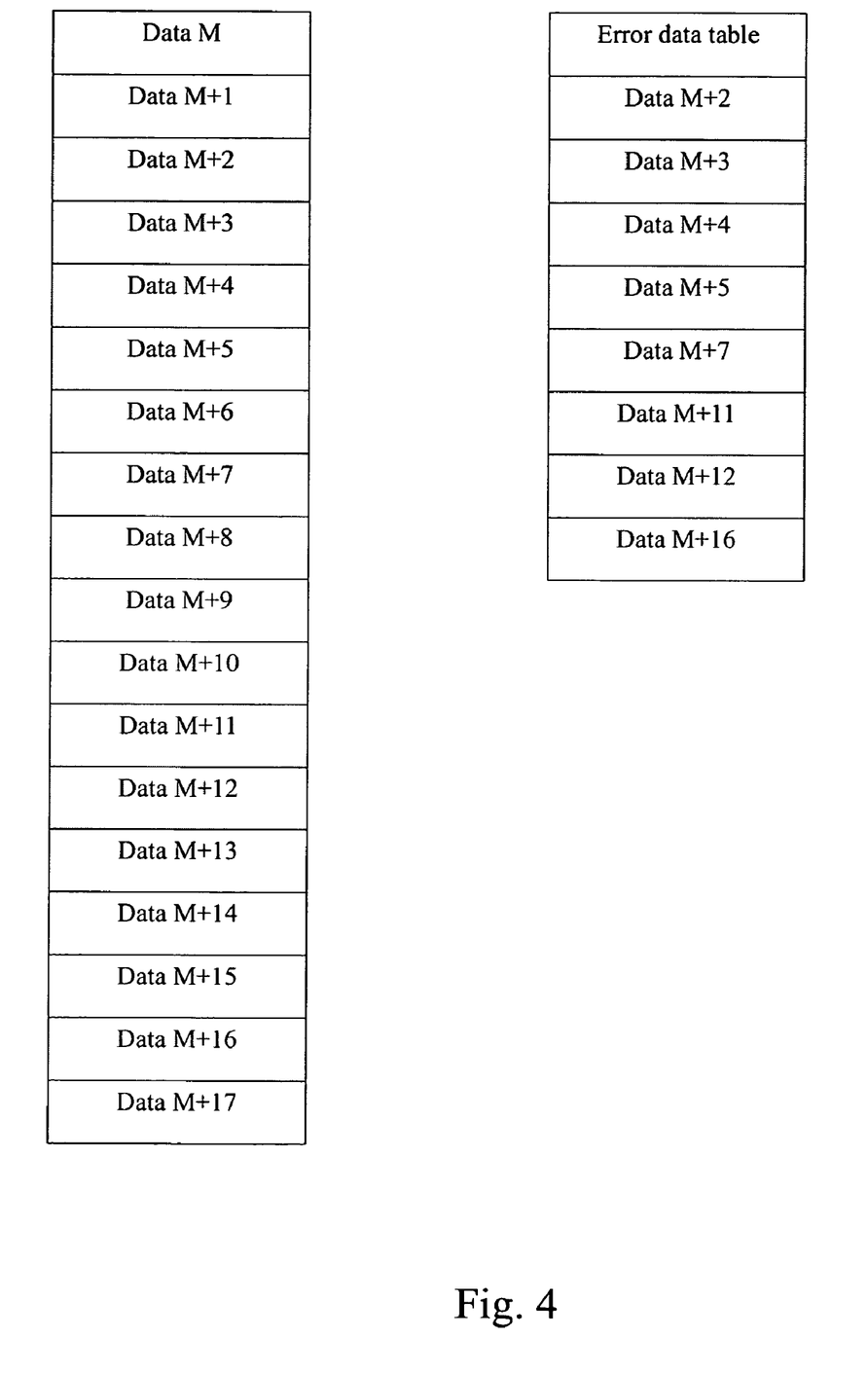
FIG. 4 is a diagram illustrating the data configuration in the disc according to one preferred embodiment of the present invention.

FIG. 4 is a diagram further illustrating the data configuration according to the embodiment described above. The blocks in white represent correct ones with an error ratio lower than the predetermined threshold, while the blocks in gray represent error ones with an error ratio higher than the predetermined threshold. After the previewing process, the addresses of the error blocks will be recorded to the error data table. Therefore, all addresses of the erroneous blocks, such as blocks M+2 to M+5, M+7, M+11, M+12, and M+16 will be recorded in the error data table. When playing the disc, those blocks recorded in the error data table will be skipped, and only correct blocks, i.e., blocks M, M+1, M+6, M+8 to M+10, M+13 to M+15, and M+17, will be played.

Figure 5:
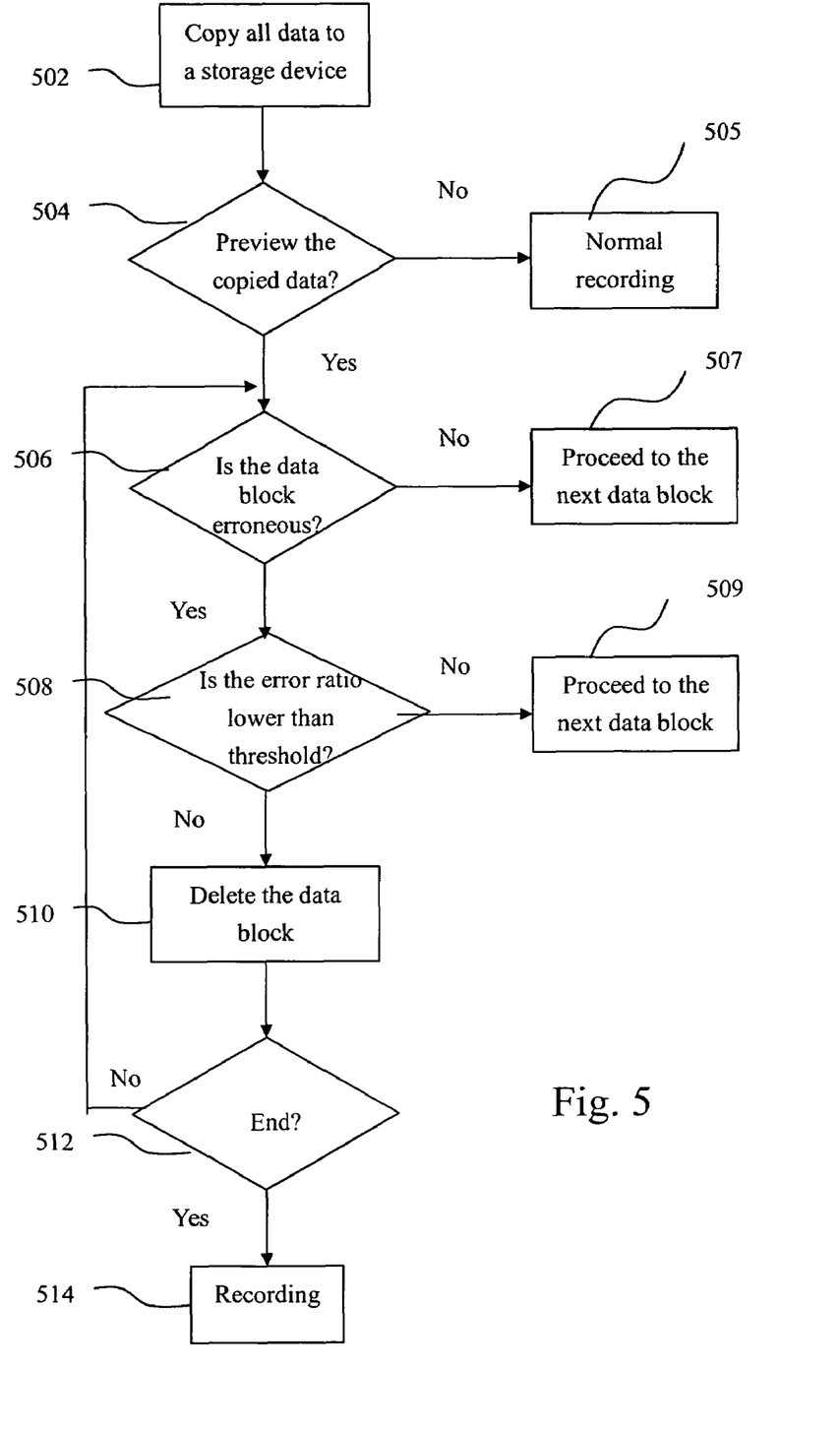
FIG. 5 is a flowchart illustrating the disc playing method according a still another preferred embodiment of the present invention.

FIG. 5 is a flowchart illustrating a still another preferred embodiment according to the present invention. The disc playing method according to this still another preferred embodiment of the present invention is implemented in a disc recorder. While the disc recorder is employed for replication, data in the source disc are first copied to a storage device, such as a hard disk (step 502). Next, the user is asked whether the previewing process should be performed on the data copied to the storage device (step 504).

If the user does not wish to preview the data, a normal recording mode can be activated for direct recording (step 505). If the previewing process is selected, the disc recorder will preview all blocks copied to the storage device to determine whether a block contains an error sector (step 506). If no error sector exists in the block, the previewing process will proceed to the next block (step 507). If there are error sectors detected, whether the error ratio of the block exceeds a predetermined threshold is determined (step 508). If the error ratio of the block is lower than the predetermined threshold, interruption will not occur while playing the data. The block will be regarded as errorless, and the previewing process will proceed to the next block (step 509).

If the error ratio of the data is higher than the predetermined threshold, an interruption will occur while playing. The block will be regarded as an erroneous one, and will be erased from the storage device (step 510). As a result, during the replication, only errorless data blocks without raising interruption will be replicated to the duplicate disc. No interruption will occur while playing the duplicate disc in the future. Finally, the user is asked whether the previewing process should be terminated (step 512), and the remaining errorless data blocks in the storage device will be copied to the duplicate disc (step 514).

Figure 6:
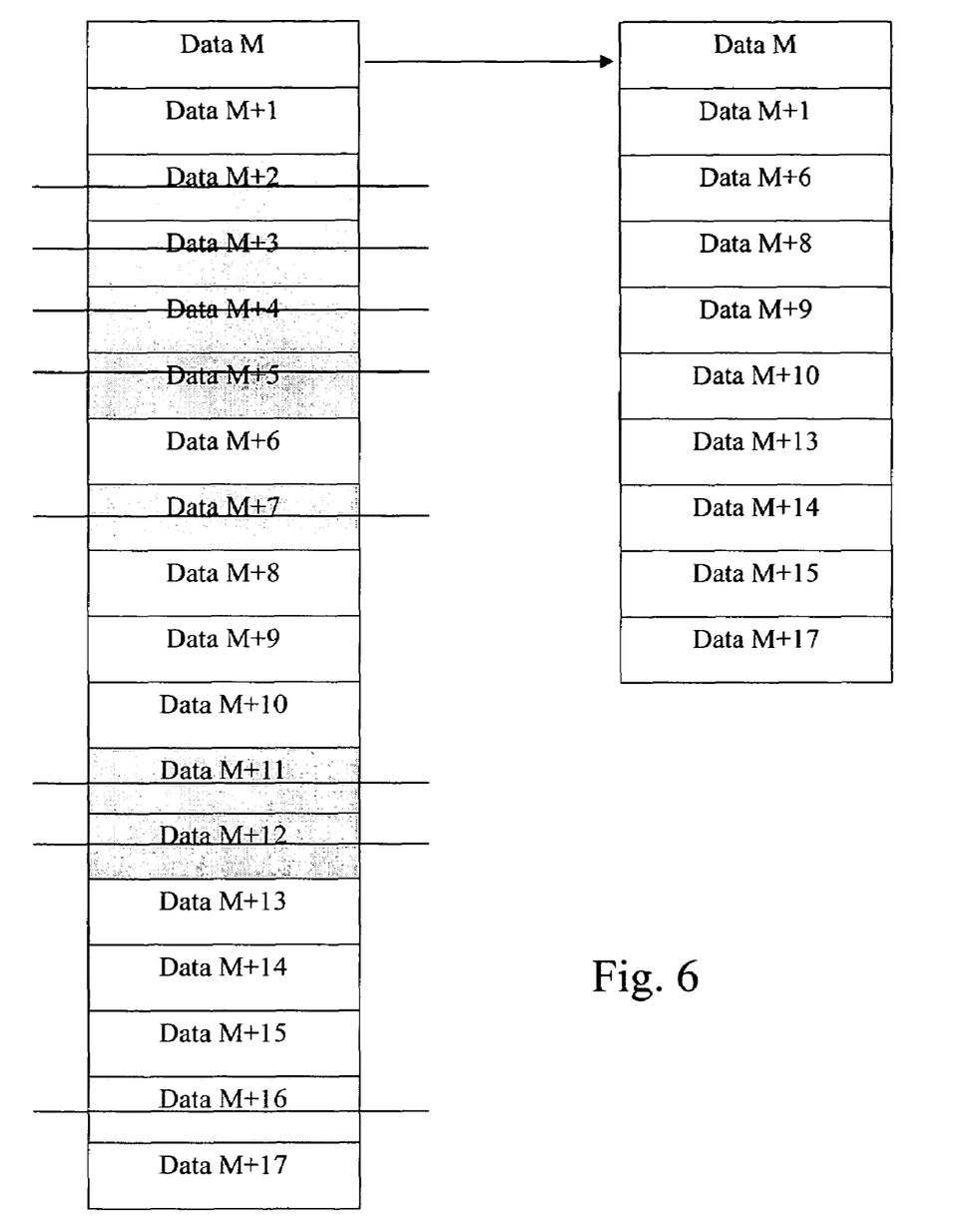
FIG. 6 is a diagram illustrating the data configuration in the disc according to the still another preferred embodiment of the present invention.

FIG. 6 is a diagram illustrating the data configuration according to this still another preferred embodiment described above. When a disc recorder is employed in replication, blocks M to M+17 in the source disc are first copied to a storage device. The blocks in white represent correct blocks with an error ratio lower than the predetermined threshold, while the blocks in gray represent error blocks with an error ratio higher than the predetermined threshold. Next, the previewing process is performed on all data blocks copied to the storage device. Erroneous blocks, such as blocks M+2 to M+5, M+7, M+11, M+12, and M+16, will be erased from the storage device after the previewing process since the error ratio of these blocks exceeds the predetermined threshold. As a result, only correct data, such as blocks M, M+1, M+6, M+8 to M+10, M+13 to M+15, and M+17, will be replicated to the duplicate disc. Therefore, when playing the duplicate disc, only correct data will be played, and no interruption will occur.

Figure 7:
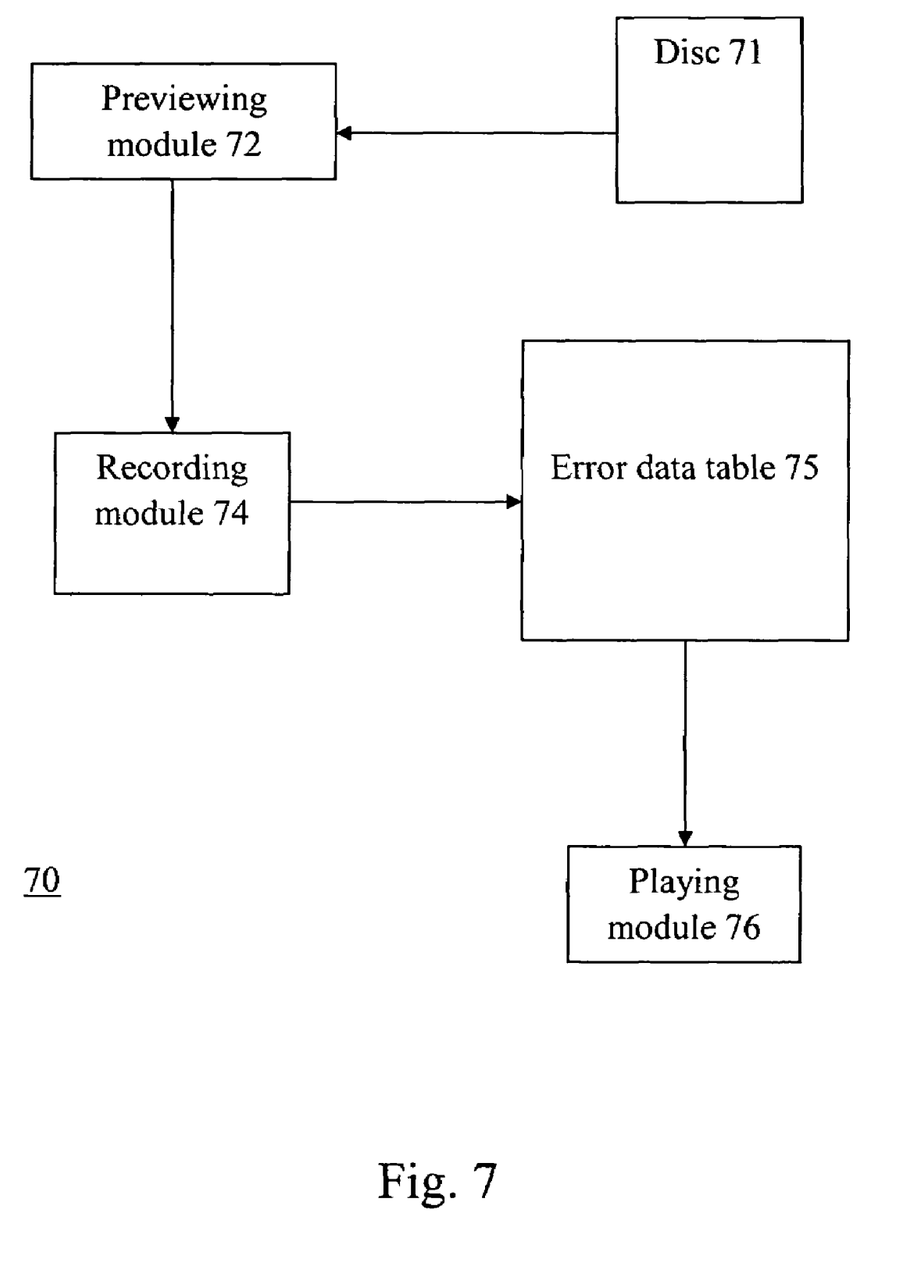
FIG. 7 is a block diagram illustrating the disc playing system according to one preferred embodiment of the present invention.

FIG. 7 is a block diagram illustrating the disc playing system according to the present invention. The disc playing system 70 includes a previewing module 72, a recording module 74, and a playing module 76. The previewing module 72 previews the data in the disc 71. In this case, the previewing module 72 only reads and decodes the data in the disc without further processing, such as playing . . . etc. The previewing module 72 also judges whether the error ratio of the previewed block exceeds a predetermined threshold. The recording module 74 records the address of the block in the error data table 75 when the error ratio of the block exceeds the predetermined threshold. The playing module 76 reads and skips those erroneous blocks recorded in the error data table while playing the disc 71. Alternatively, as in the embodiments described above, the recording module 74 can also record all addresses of the blocks with the error ratio lower than the predetermined threshold in a correct table (not shown). The playing module 76 reads the addresses from the correction table, and only plays these correct data.

The previewing module 72, the recording module 74, or the playing module 76, can be embodied in the form of an IC chip, firmware, or program codes, and are not limited to a particular implementation format. For example, a processor of the disc playing system that might be embedded in the IC chip, may fetch and perform related control codes stored in a ROM and then act as the previewing module 72, recording module 76, and playing module 78 aforementioned. Additionally, any storage device similar to ROM such as Flash ROM, EEPROM, or the like, may be used for storing associated control codes. Any ordinary person having skills in the art may vary or modify the disclosed embodiments as requirements, but all similar modifications within the spirits of the embodiment should be included in the appended claims.

The disc playing method according to the present invention previews the entire disc with high scanning speed without playback. The error data blocks found during the preview are recorded. During playing process, only correct data blocks on the disc are played, and the recorded error data blocks will be skipped. Smooth disc playing without interruption due to error data can therefore be achieved. The audience can therefore enjoy superior entertainment quality. Besides, the disc playing method and the disc playing system can be implemented in various disc playing devices or disc recording devices.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A disc playing method without interruption, the disc playing method comprising:
   previewing a data block on a disc to judge whether an error ratio of the data block exceeds a predetermined threshold;
   marking the data block as an error data when the error ratio of the data block exceeds the predetermined threshold;
   repeating the previewing and the marking steps above for all the data blocks in the disc; and
   playing all the unmarked data blocks, wherein when the error ratio of the data block is lower than the predetermined threshold, an address of the data block is recorded in a correct data table and only the data blocks recorded in the correct data table are played.

2. The disc playing method of claim 1, wherein when the error ratio of the data block exceeds the predetermined threshold, an address of the data block is recorded in an error data table.

3. The disc playing method of claim 2, further comprising recording an identification code of the disc in the error data table.

4. The disc playing method of claim 3, wherein when playing the disc next time, the error data table of the disc is read according to the identification code recorded in the error data table.

5. The disc playing method of claim 1, wherein the previewing step is performed at a scanning speed higher than a playing speed.

6. The disc playing method of claim 1, wherein in the previewing step, the data blocks from the disc are read and decoded.

7. The disc playing method of claim 1, wherein the error ratio is determined according to an Error Correction Code of the data block.

8. The disc playing method of claim 1, wherein in the previewing step, whether the error ratio of the data block exceeds the threshold is determined according to a time required for decompressing the data.

9. A disc playing system, comprising:
   a previewing module for previewing a data block on a disc to judge whether an error ratio of the data block exceeds a predetermined threshold;
   a recording module for marking the data block as error data when the error ratio of the data block exceeds the predetermined threshold; and a playing module for playing the data blocks not marked as error data, wherein the recording module records an address of the data block in a correct table when the error ratio of the data block is lower than the predetermined threshold, and the playing module plays the data blocks recorded in the correct table.

10. The disc playing system of claim 9, wherein the recording module records an address of the data block in an error data table when the error ratio of the data block exceeds the predetermined threshold.

11. The disc playing system of claim 10, wherein an identification code of the disc is further recorded in the error data table.

12. The disc playing system of claim 11, wherein when playing the disc next time, the error data table of the disc is read according to the identification code recorded in the error data table.

13. The disc playing system of claim 9, wherein the previewing module previews the data block from the disc by only reading and decoding.

14. The disc playing system of claim 9, wherein the previewing module previews the data block from the disc at a scanning speed higher than a playing speed.

15. The disc playing system of claim 9, wherein the previewing module determines whether the error ratio of the data block exceeds the predetermined threshold according to an Error Correction Code of the data.

16. The disc playing system of claim 9, wherein the previewing module determines whether the error ratio of the data exceeds the threshold according to a time required for decompressing the data.

* * * * *